US008483708B2

(12) United States Patent
Lee

(10) Patent No.: US 8,483,708 B2
(45) Date of Patent: Jul. 9, 2013

(54) MOBILE TERMINAL AND CORRESPONDING METHOD FOR TRANSMITTING NEW POSITION INFORMATION TO COUNTERPART TERMINAL

(75) Inventor: Wonjong Lee, Gwangmyeong-si (KR)

(73) Assignee: LG Electronics Inc., Seoul (KR)

( * ) Notice: Subject to any disclaimer, the term of this patent is extended or adjusted under 35 U.S.C. 154(b) by 134 days.

(21) Appl. No.: 13/025,057

(22) Filed: Feb. 10, 2011

(65) Prior Publication Data
US 2011/0300877 A1 Dec. 8, 2011

(30) Foreign Application Priority Data
Jun. 7, 2010 (KR) ........................ 10-2010-0053255

(51) Int. Cl.
H04W 24/00 (2009.01)
(52) U.S. Cl.
USPC .................. 455/456.1; 455/456.3; 455/456.6; 455/457; 455/459
(58) Field of Classification Search
None
See application file for complete search history.

(56) References Cited

U.S. PATENT DOCUMENTS

| | | | |
|---|---|---|---|
| 8,140,012 B1 * | 3/2012 | Causey et al. ................ | 455/41.2 |
| 2006/0009238 A1 * | 1/2006 | Stanco et al. ............. | 455/456.2 |
| 2008/0171555 A1 * | 7/2008 | Oh et al. ..................... | 455/456.1 |
| 2008/0268876 A1 * | 10/2008 | Gelfand et al. .............. | 455/457 |
| 2009/0009626 A1 * | 1/2009 | Ko et al. ..................... | 348/231.3 |
| 2009/0098888 A1 * | 4/2009 | Yoon .......................... | 455/456.2 |
| 2009/0209293 A1 * | 8/2009 | Louch .......................... | 455/566 |
| 2009/0210148 A1 * | 8/2009 | Jayanthi ....................... | 701/206 |
| 2010/0075712 A1 * | 3/2010 | Sethuraman et al. ....... | 455/556.1 |
| 2010/0190466 A1 * | 7/2010 | Borislow et al. ............ | 455/404.2 |
| 2010/0250136 A1 * | 9/2010 | Chen ............................ | 701/300 |
| 2010/0272426 A1 * | 10/2010 | Huliyapur Math ........... | 396/310 |
| 2011/0144898 A1 * | 6/2011 | Konig ........................... | 701/200 |

* cited by examiner

Primary Examiner — Rafael Pérez-Gutiérrez
Assistant Examiner — Suhail Khan
(74) Attorney, Agent, or Firm — Birch, Stewart, Kolasch & Birch, LLP

(57) ABSTRACT

A mobile terminal including a wireless communication unit configured to wirelessly communicate with at least one other counterpart terminal; a camera module configured to capture images; a touchscreen display configured to receive touch inputs and to display information; a position location module configured to provide a location of the terminal; and a controller configured to control the camera module to capture a preview image, to display the captured preview image on the touchscreen, to receive a designation input command indicating a destination object included in the camera preview image displayed on the touchscreen, to calculate position information of the designated destination object based on the location of the terminal provided by the position location module, and to transmit the calculated position information to the counterpart terminal.

26 Claims, 13 Drawing Sheets (6-1)

(6-2)

(6-3)

(6-4)

(7-1)

(7-2)

(7-3)

(9-1)

(9-2)

(9-3)

(9-4)

(10-1)

(10-2)

(10-3)

(13-1)

"Yes" ↓

(13-2)

"No"

(13-3)

MOBILE TERMINAL AND CORRESPONDING METHOD FOR TRANSMITTING NEW POSITION INFORMATION TO COUNTERPART TERMINAL

CROSS REFERENCE TO RELATED APPLICATIONS

Pursuant to 35 U.S.C. §119(a), this application claims the benefit of earlier filing date and right of priority to Korean Application No. 10-2010-0053255, filed on Jun. 7, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, the mobile terminal is provided with a camera module and is frequently utilized for a video and/or still picture photographing function. A camera preview image, which is provided by the camera module to photograph a video and/or a still picture, can be used to provide a terminal user with various kinds of information on an object within the camera preview image. And, the demand for a method for enabling the provided information to be shared with a counterpart is ongoing to rise.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a camera preview image provided by a camera module provided to a mobile terminal to photograph a video and/or a still picture is used to provide a terminal user with various kinds of information on an object within the camera preview image.

An object of the present invention is to provide a mobile terminal and controlling method thereof, by which the provided information can be shared with a counterpart.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a user input unit, a wireless communication unit, a camera module, a touchscreen configured to display a camera preview image, a position location module configured to obtain position information, and a controller configured, when a destination in the camera preview image is designated, to transmit position information of the designated destination to a counterpart terminal.

In another aspect of the present invention, a method of controlling a mobile terminal according to the present invention includes displaying a camera preview image on a touchscreen, designating a destination in the displayed camera preview image, and transmitting position information of the designated destination to a counterpart terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
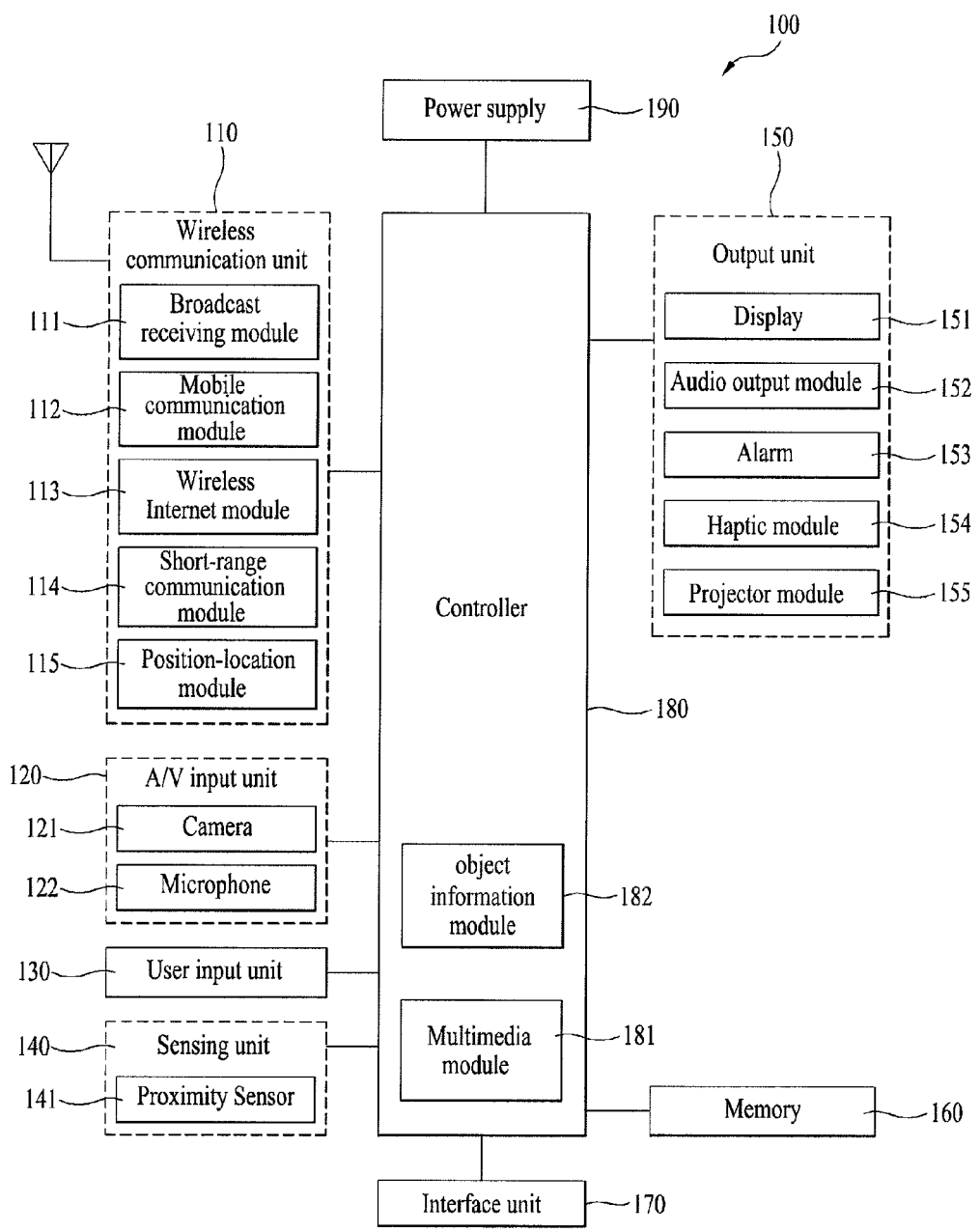
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA(High Speed Downlink Packet Access), GSM, CDMA, WCDMA, LTE (Long Term Evolution) etc.

The wireless internet module by Wi-Fi can be specifically named 'Wi-Fi module'.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory unit 160 can store the database relating to object information of an object (e.g., building, shop, milestone, etc.) that can be searched using at least one of shape recognizing information related to the object within an image photographed by the camera and position information of the mobile terminal 100 obtained through the position-location module. Hereinafter, the database relating to object information can be referred to as "object information database". The object information can include at least one of relevant text information (e.g., a name of the building, a name of the shop, etc.), relevant link information (e.g., link information of the building, link information of the shop, etc.), relevant image information (e.g., an image logo of the building, an image logo of the shop, etc.) (non-limited to them) and audio information (e.g., a logo song of the building, a logo song of the shop, etc.), of the shape recognized object.

The database stored in the memory unit 160 can be updated or downloaded from a database of an external server via the wireless communication unit. The database of the memory unit 160 can include the data constructed in a manner of downloading every part of the database of the external server. Alternatively, the database of the memory unit 160 can include the data constructed in a manner of downloading a portion of the database of the external server in consideration of the capacity of the memory unit 160. The portion of the database of the external server may be provided for an object located within a predetermined distance from a current location of the terminal or may be provided for an object located in a predetermined area (e.g., an administrative district) related to the current location of the terminal.

It is not mandatory for the database to be downloaded to the memory 160. For instance, each time the mobile terminal needs the database, the external server provided with the database is accessed by real time via the wireless communication unit so that the database can be referred to.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The controller 180 is able to identify a prescribed image part of a prescribed image (e.g., a camera preview image, a play image) through the shape recognizing processing.

Meanwhile, the controller 180 can be configured to implement augmented reality (abbreviated AR). The augmented reality is a sort of virtual reality that combines a real world seen through user's eyes and a virtual world having side information into one image. Namely, the augmented reality, which complements a real world with a virtual world, plays a role in providing information necessary for the real world additionally using graphics. The controller 180 is able to display the object information in form of the augmented reality.

The controller 180 can be provided with an object information module 182 for the processing related to a display of the object information. The object information module 182 can be implemented within the controller 180 or be being separated from the controller 180.

The controller 180 is able to control the wireless communication unit 100 to receive location information of a terminal of a counterpart pre-registered with the phonebook or a specific group in the phonebook for example. The terminal of the counterpart may be occasionally expressed as the "counterpart terminal" or simply "counterpart". The counterpart terminal directly provides its location information to the mobile terminal 100. Alternatively, a mobile communication network, with which the counterpart terminal has been registered, obtains location information of the counterpart terminal and then provides the obtained location information to the mobile terminal 100.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
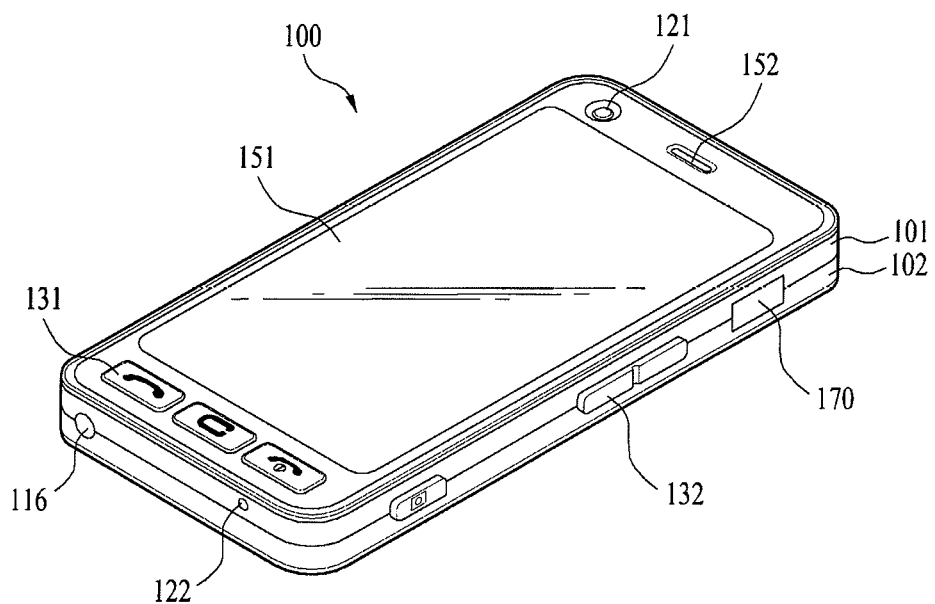
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 3:
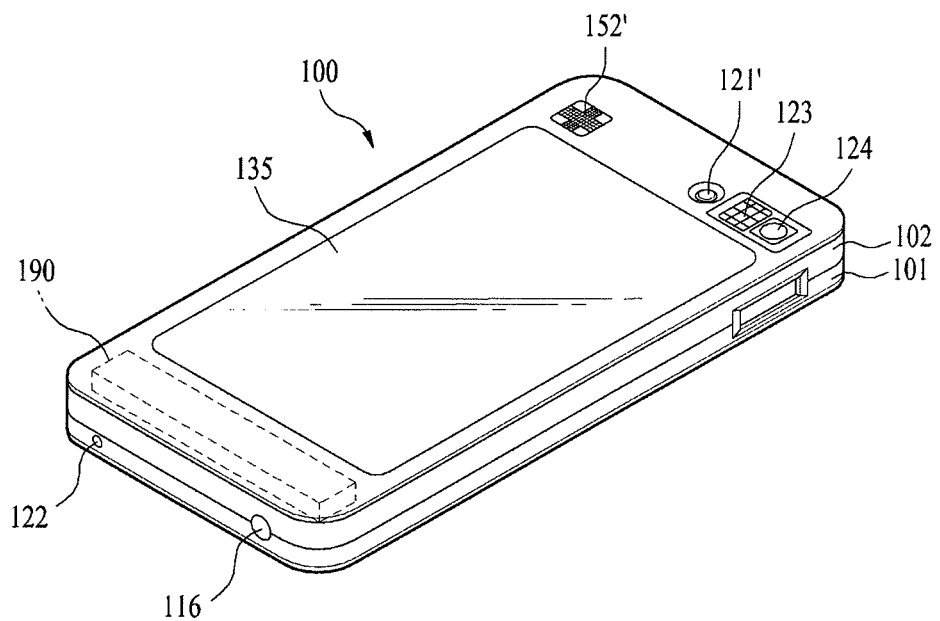
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 21 A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, embodiments related to a controlling method, which can be implemented in the mobile terminal 100, are explained with reference to the accompanying drawings.

If the display module 151 includes a touchscreen, implementation of the following embodiment is further facilitated. Therefore, the following description is made on the assumption that the display module 151 includes a touchscreen. And, a display screen of the touchscreen 151 is indicated by a reference number 400 in the following description.

Figure 4:
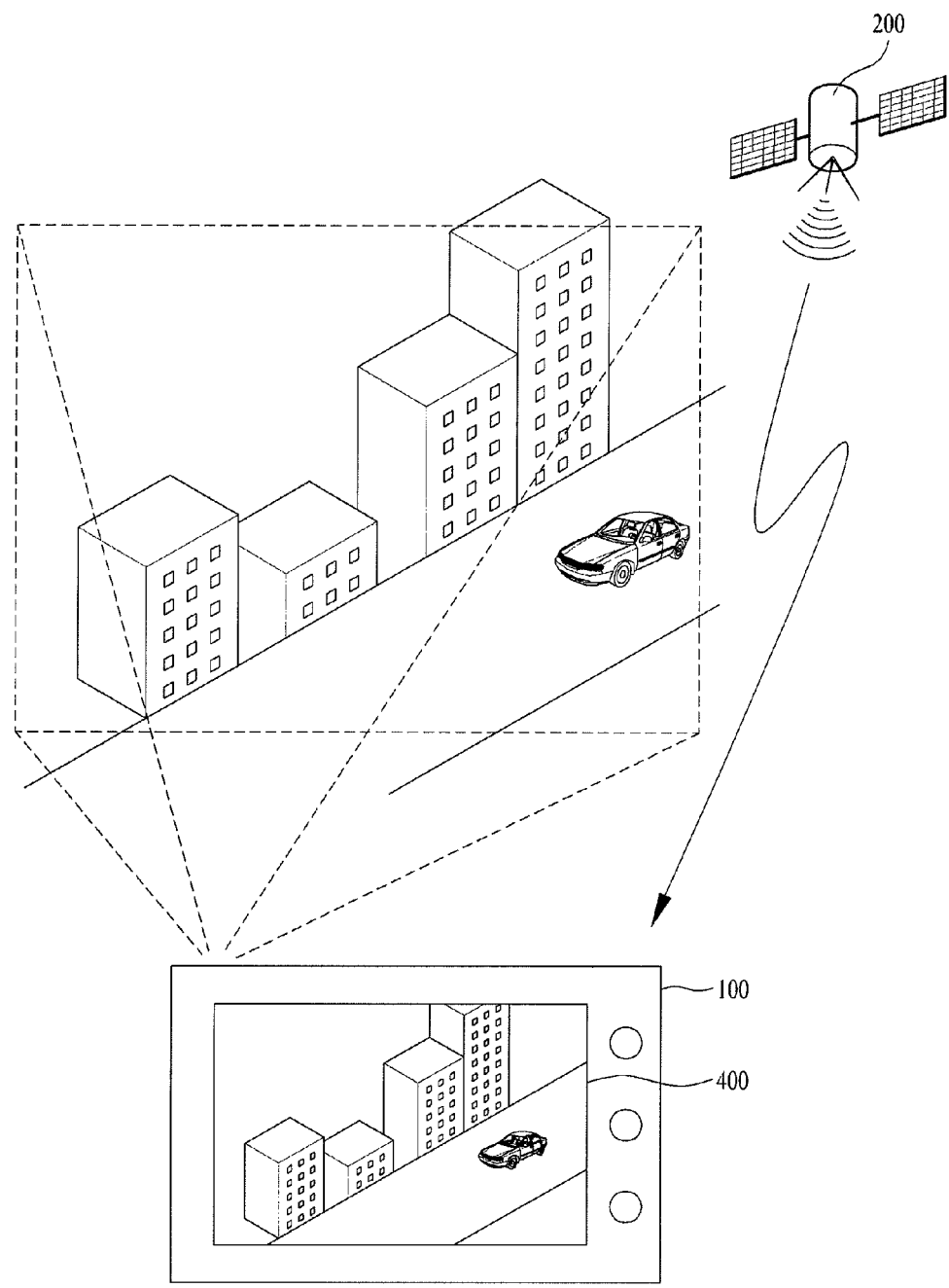
FIG. 4 is a diagram of an environment for implementing a method of controlling a mobile terminal according to an embodiment of the present invention.

FIG. 4 is a diagram of an environment for implementing a method of controlling a mobile terminal according to an embodiment of the present invention.

Referring to FIG. 4, the mobile terminal 100 is able to photograph a peripheral image as a preview image (hereinafter named a camera preview image) via the camera module 121. And, the mobile terminal 100 is able to display the camera preview image on the touchscreen 400.

Moreover, the mobile terminal 100 is able to receive at least one (hereinafter named position information) of latitude, longitude, altitude and direction of the mobile terminal 100 from a satellite 200 via the position location module.

Using at least one of the position information of the mobile terminal 100 and the pattern recognition information of the camera preview image, the controller 180 identifies an object included in the camera preview image and is then able to control information on the object, i.e., object information to be displayed on the touchscreen 400.

In the following description, utilization of the camera preview image is explained in detail.

Figure 5:
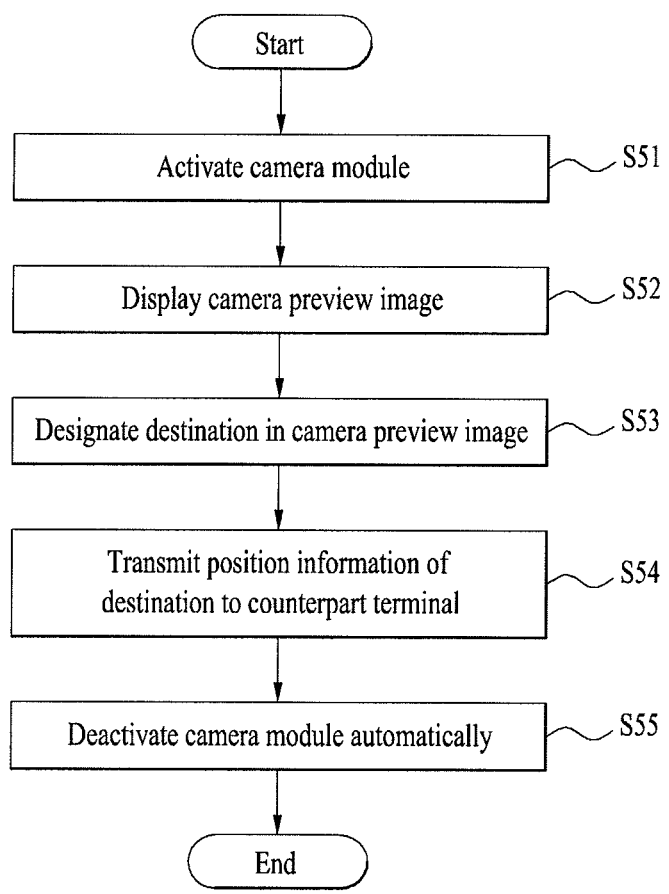
FIG. 5 is a flowchart for a method of controlling a mobile terminal according to an embodiment of the present invention.
Figure 6:
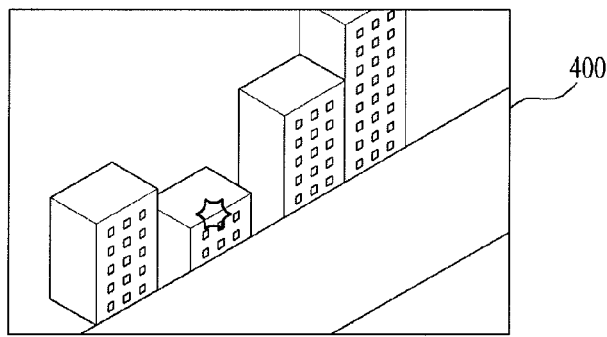
FIG. 6 and FIG. 7 are diagrams of display screen configurations for implementing a method of controlling a mobile terminal according to an embodiment of the present invention.
Figure 6:
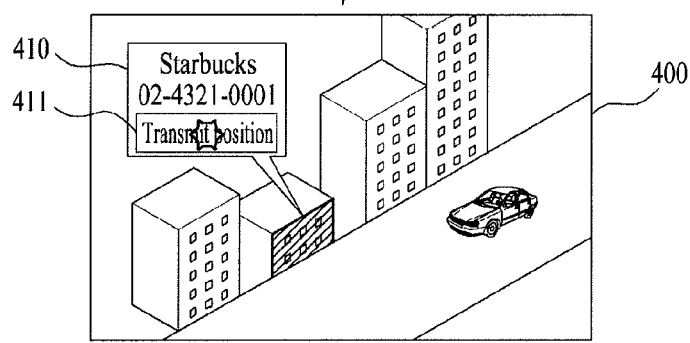
Figure 6:
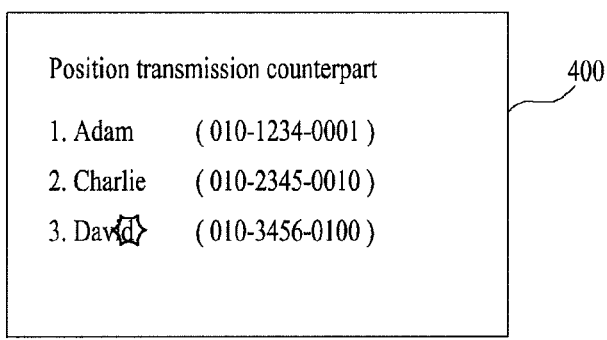
Figure 6:
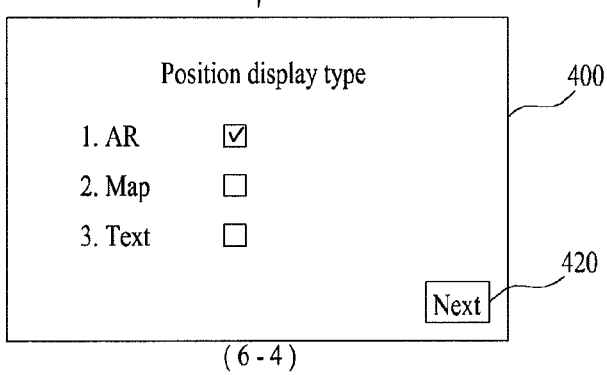
Figure 7:
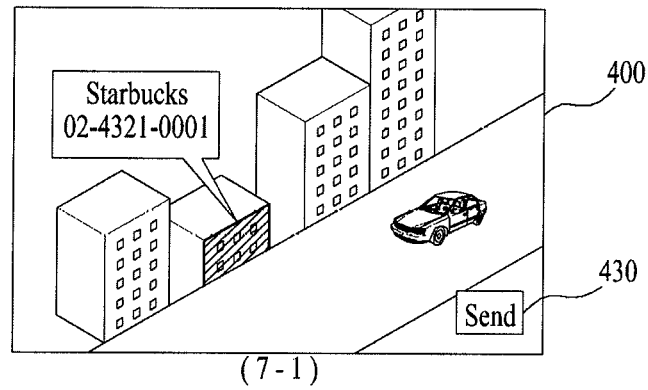
Figure 7:
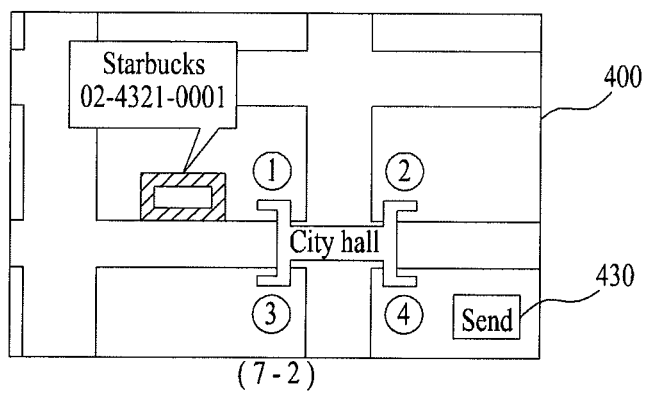
Figure 7:
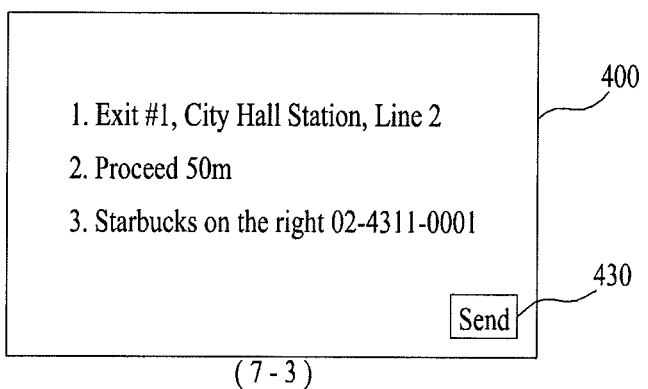

FIG. 5 is a flowchart for a method of controlling a mobile terminal according to an embodiment of the present invention, and FIG. 6 and FIG. 7 are diagrams of display screen configurations for implementing a method of controlling a mobile terminal according to an embodiment of the present invention.

Referring to FIGS. 5 to 7, the camera module 121 can be activated in the mobile terminal 100 [S51].

If so, referring to FIG. 6 (6-1), the camera preview image is displayed on the touchscreen 400 [S52].

Then, a desired point on the touchscreen 400 can be touched and selected as a destination [S53].

The controller 180 determines whether there exists an object corresponding to the destination using the object information database.

If the object corresponding to the destination exists, referring to FIG. 6 (6-2), the controller 180 is able to display object information 410 of the corresponding object on the camera preview image by AR. If necessary, the controller 180 is then able to capture the camera preview image on which the object information 410 of the corresponding object is displayed. Usage of the captured camera preview image shall be described later.

A position transmit icon 411 can be displayed on the object information 410 to transmit the position of the corresponding object, i.e., the destination to a counterpart.

A terminal user touches and selects the position transmit icon 411 so that 'whether to transmit the position of the destination to the counterpart' can be inputted to the mobile terminal 100. It is not mandatory that the position transmit icon 411 should be displayed on the touchscreen 400. For instance, a terminal user is able to input 'whether to transmit the position of the destination to the counterpart' to the mobile terminal 100 by an appropriate manipulation of the user input unit 130. This is apparent to those skilled in the art and its details are omitted for clarity of the present specification or disclosure.

Once the position transmit icon 411 is touched and selected, referring to FIG. 6 (6-3), a counterpart list can be displayed on the touchscreen 400 to select a counterpart to transmit the position of the destination to. A desired counterpart can be selected from the list in a manner of being touched on the touchscreen 400.

In this case, the counterpart list can include a list of counterparts previously registered with a phonebook stored in the memory. FIG. 6 (6-3) exemplarily shows that a user interface is displayed to select a counterpart for transmitting the position of the destination from the counterpart list, by which the present embodiment is non-limited. Alternatively, it is able to display a user interface for directly inputting a phone number or email address of a counterpart for transmitting the position of the destination.

Meanwhile, if the counterpart for transmitting the position of the destination is selected or inputted, referring to FIG. 6 (6-4), at least one or more position display types are displayed on the touchscreen 400 to display the position of the destination. The terminal user is then able to select at least one of the position display types.

FIG. 6 (6-4) exemplarily shows the position display types including an AR type, a map type and a text type.

In case that the AR type has been touched and selected in FIG. 6 (6-4) and then a 'next' icon 420 is touched on the touchscreen 400, the controller 180 is able to display the captured camera preview image in which the object information corresponding to the destination is displayed by the AR type [FIG. 7 (7-1)]. The terminal user confirms the destination position displayed by the AR type and then touches a 'transmit' icon 430 on the touchscreen 400. If so, the mobile terminal 100 is able to transmit the destination position to the counterpart [S54].

In case that the map type has been touched and selected in FIG. 6 (6-4) and then the 'next' icon 420 is touched on the touchscreen 400, the controller 180 is able to display the position of the destination in a manner that the destination position is marked on a map of the destination position periphery. In this case, the map of the destination position periphery can be obtained from a map database, which is stored in the memory 160 in advance or can be downloaded from an external server (not shown in the drawing) provided with the map database via the wireless communication unit 110 [FIG. 7 (7-2)]. The terminal user confirms the destination position displayed by the map type and then touches a 'transmit' icon 430 on the touchscreen 400. If so, the mobile terminal 100 is able to transmit the destination position to the counterpart [S54].

In case that the text type has been touched and selected in FIG. 6 (6-4) and then a 'next' icon 420 is touched on the touchscreen 400, the controller 180 is able to describe a path to the position of the destination from a representative landmark point around the destination location in a manner of representing the path as a text with reference to a map of the destination position and its periphery [FIG. 7 (7-3)]. The terminal user confirms the destination position described by the text type and then touches a 'transmit' icon 430 on the touchscreen 400. If so, the mobile terminal 100 is able to transmit the destination position to the counterpart [S54].

It is not mandatory for the 'next' icon and the 'transmit' icon to be displayed on the touchscreen 400. It is apparent to those skilled in the art that each corresponding function can be performed via an appropriate manipulation of the user input unit 130.

In FIG. 6 (6-4), it is not necessary for only one kind of the position display type to be selected. Instead, at least two kinds of position display types can be selected together at the same time. If so, the controller 180 is able to transmit the destination position according to the at least two position display types to the counterpart.

In case that the transmitted destination position follows the AR type or the map type, it can be transmitted to the counterpart via a multimedia message or an email. In case that the transmitted destination position follows the text type, it can be transmitted to the counterpart via a short text message, a multimedia message or an email.

After the camera preview image is captured such that the destination position is selected in the camera preview image or after the destination position is transmitted to the counterpart, the controller 180 is able to control the camera module 121 to be automatically deactivated [S55].

After the destination position has been transmitted to the counterpart, the controller 180 can control the transmitted destination position to be automatically stored in the memory 160 or control the transmitted destination position to be automatically transmitted to an SNS (social network system) preset by the mobile terminal 100 via the wireless communication unit 110.

If a desired position in the camera preview image is touched and an object corresponding to the touched point exists, object information on the corresponding object is displayed, by which the present embodiment is non-limited. Alternatively, before a terminal user designates a destination, object information on all objects in the camera preview image is displayed in advance. The terminal user designates one of the displayed objects as a destination. Thus, the object information of the object corresponding to the destination can be configured to be transmitted to the counterpart. This is apparent to those skilled in the art in consideration of the aforesaid description and its details shall be omitted for clarity of the present specification or disclosure.

In the above description so far, the mobile terminal provides the position of the destination to the counterpart, by which the present embodiment is non-limited. Alternatively, the mobile terminal 100 is able to provide a specific counterpart with path information on a path from a position of the specific counterpart to the destination. This is explained in detail with reference to FIGS. 8 to 10 as follows.

Figure 8:
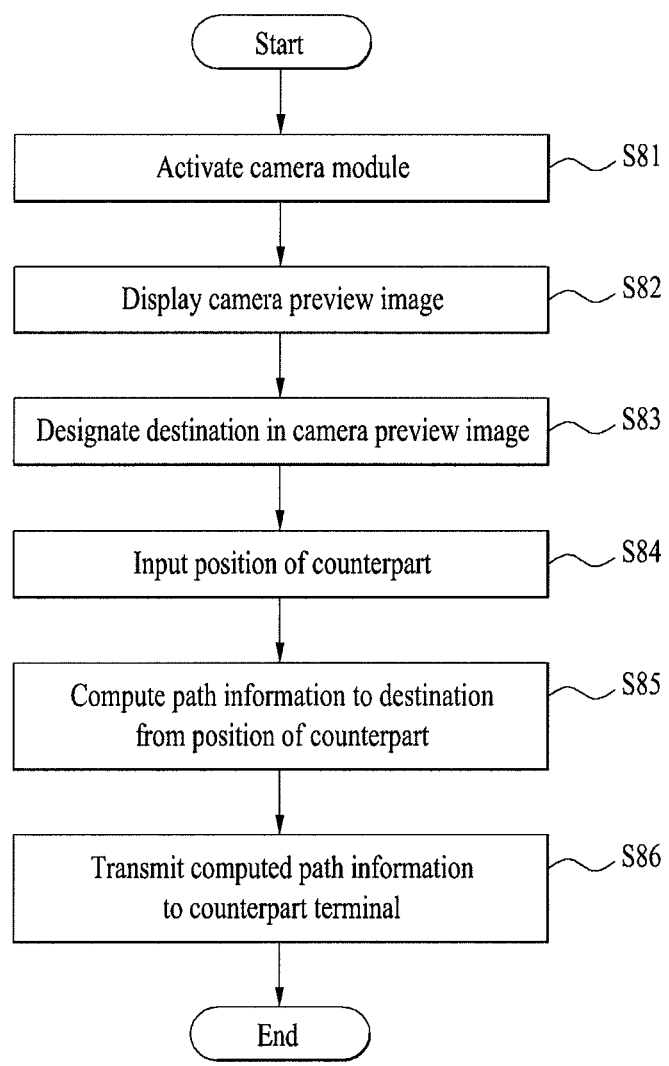
FIG. 8 is a flowchart for a method of controlling a mobile terminal according to an embodiment of the present invention.
Figure 9:
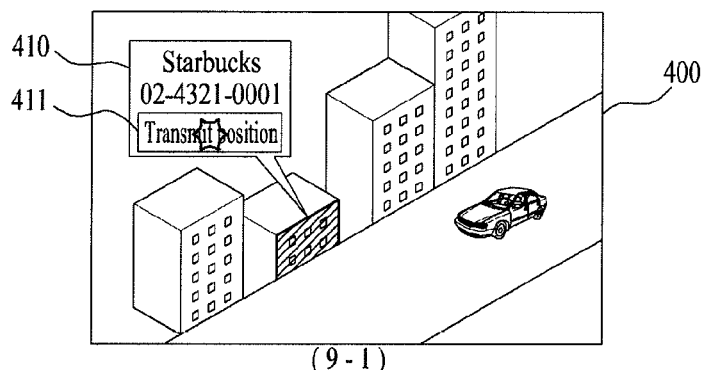
FIG. 9 and FIG. 10 are diagrams of display screen configurations for implementing a method of controlling a mobile terminal according to an embodiment of the present invention.
Figure 9:
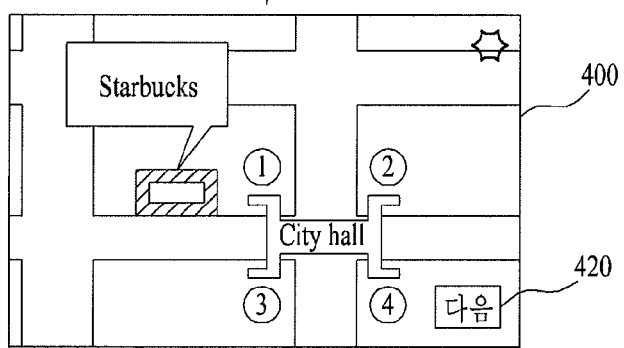
Figure 9:
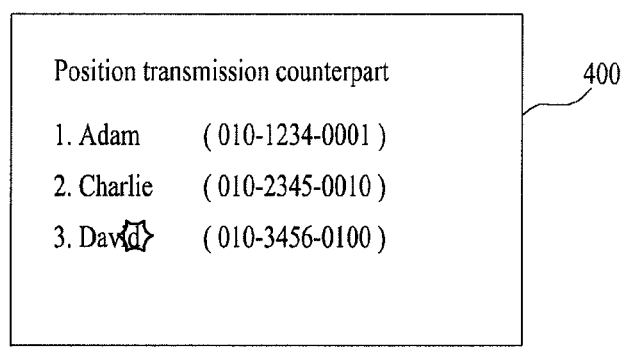
Figure 9:
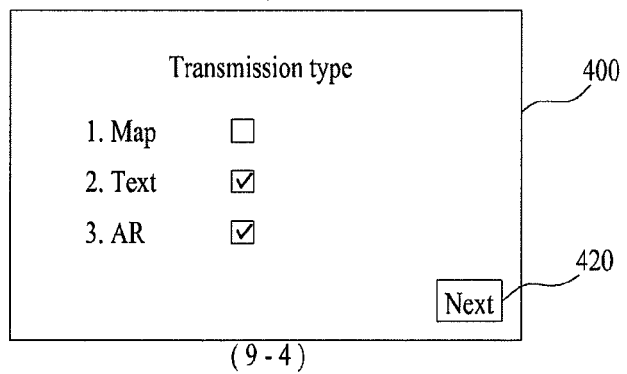
Figure 10:
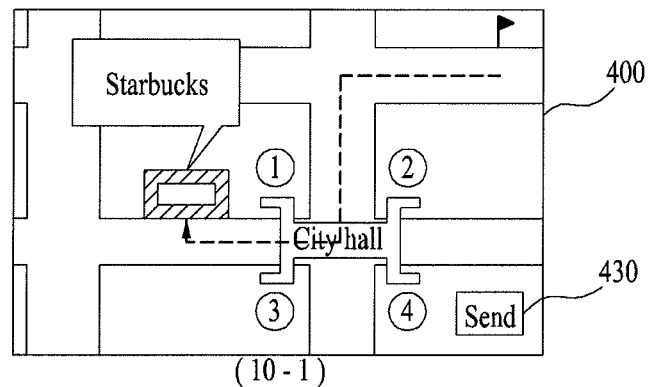
Figure 10:
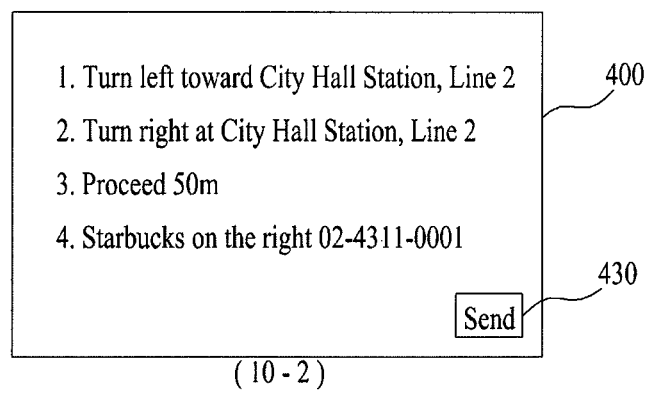
Figure 10:
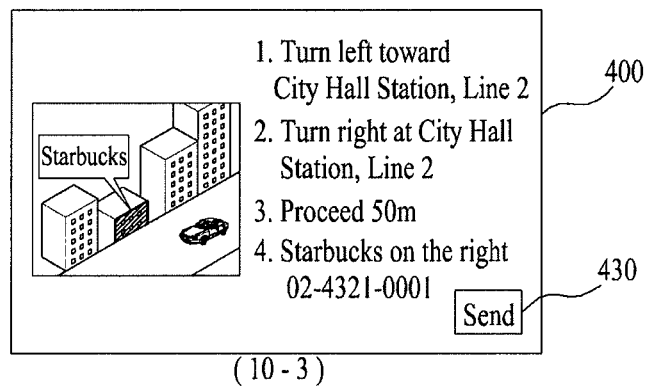

FIG. 8 is a flowchart for a method of controlling a mobile terminal according to an embodiment of the present invention. FIG. 9 and FIG. 10 are diagrams of display screen configurations for implementing a method of controlling a mobile terminal according to an embodiment of the present invention.

Referring to FIGS. 8 to 10, as mentioned in the foregoing description, the camera module 121 is activated n the mobile terminal 100. And, the camera preview image can be displayed on the touchscreen 400 [S81, S82].

One point can be touched and selected as a destination on the touchscreen 400 on which the camera preview image is displayed [S83].

Using the object information database, the controller 180 determines whether an object corresponding to the destination exists. If the object corresponding to the destination exists, the controller 180 is able to display object information 410 of the corresponding object on the camera preview image by AR [FIG. 9 (9-1)].

As mentioned in the foregoing description, a position transmit icon 411 for transmitting a position of the corresponding object (i.e., the destination) to a counterpart can be displayed on the object information 410. And, a terminal user is able to input 'whether to transmit the position of the destination to the counterpart' to the mobile terminal 100 by touching and selecting the position transmit icon 411 for example.

For instance, if a user command for transmitting the destination position to the counterpart is inputted, for example, by touching the position transmit icon 411, the controller 180 controls a map of the destination position and its periphery to be displayed on the touchscreen 400 [FIG. 9 (9-2)].

When the terminal user performs a touch & drag on the touchscreen 400, the controller 180 is able to control a currently unseen map to be newly displayed on the touchscreen 400 in a manner of scrolling the map on the touchscreen 400 in a scroll direction [not shown in the drawing].

The terminal user is able to manually input a position of the counterpart by touching the touchscreen 400 for example [S84].

Once the position of the counterpart is inputted, the controller 180 computes path information from the position of the counterpart to the destination by referring to the map database [S85].

As mentioned in the foregoing description, a counterpart list for selecting a counterpart, to which the path information will be transmitted, is displayed on the touchscreen 400 [FIG. 9 (9-3)]. And, a desired counterpart is touched and selected from the list on the touchscreen 400.

At least one path display types (e.g., AR type, map type, text type, etc.) for displaying the path information are displayed on the touchscreen 400 [FIG. 9 (9-4)]. As mentioned in the foregoing description, the terminal user is able to select at least one of the path display types.

In case that the selected path display type is the map type, referring to FIG. 10 (10-1), the controller 180 is able to display a map, on which the computed path information is represented, on the touchscreen 400.

In case that the text type is selected as the path display type, referring to FIG. 10 (10-2), the controller 180 is able to display a text for describing the computed path information on the touchscreen 400.

In case that both the text type and the AR type are selected as the path display type, referring to FIG. 10 (10-3), the controller 180 is able to display a text for describing the computed path information on the touchscreen 400 together with the captured camera preview image in which the object information corresponding to the destination is displayed by the AR type.

In case that the text type and the map type are selected as the path display type, the controller 180 is able to display a text for describing the computed path information on the touchscreen 40 together with a map having the computed path information represented thereon [not shown in the drawing].

In case that all of the map type, the text type and the AR type are selected as the path display type, the controller 180 is able to display the text for describing the computed path information, the captured camera preview image, in which the object information corresponding to the destination is displayed by the AR type, and the map having the computed path information represented thereon together.

Afterwards, the controller 180 is able to transmit the displayed path information to a terminal of the counterpart [S86].

In the above description, the position of the counterpart is directly inputted to the mobile terminal 100 by the terminal user. Yet, as mentioned in the foregoing description, in case that the mobile terminal 100 is directly provided with the position information of the counterpart terminal from the counterpart terminal or from a mobile communication network accessed by the counterpart terminal, the step S84 of inputting the position of the counterpart can be omitted.

In the following description, a method of providing a specific counterpart with path information on a path from a position of the specific counterpart to a destination in case that the terminal user is performing a communication (e.g., a voice call communication, an instant message communication, etc.) with the specific counterpart is described with reference to FIGS. 11 to 13.

Figure 11:
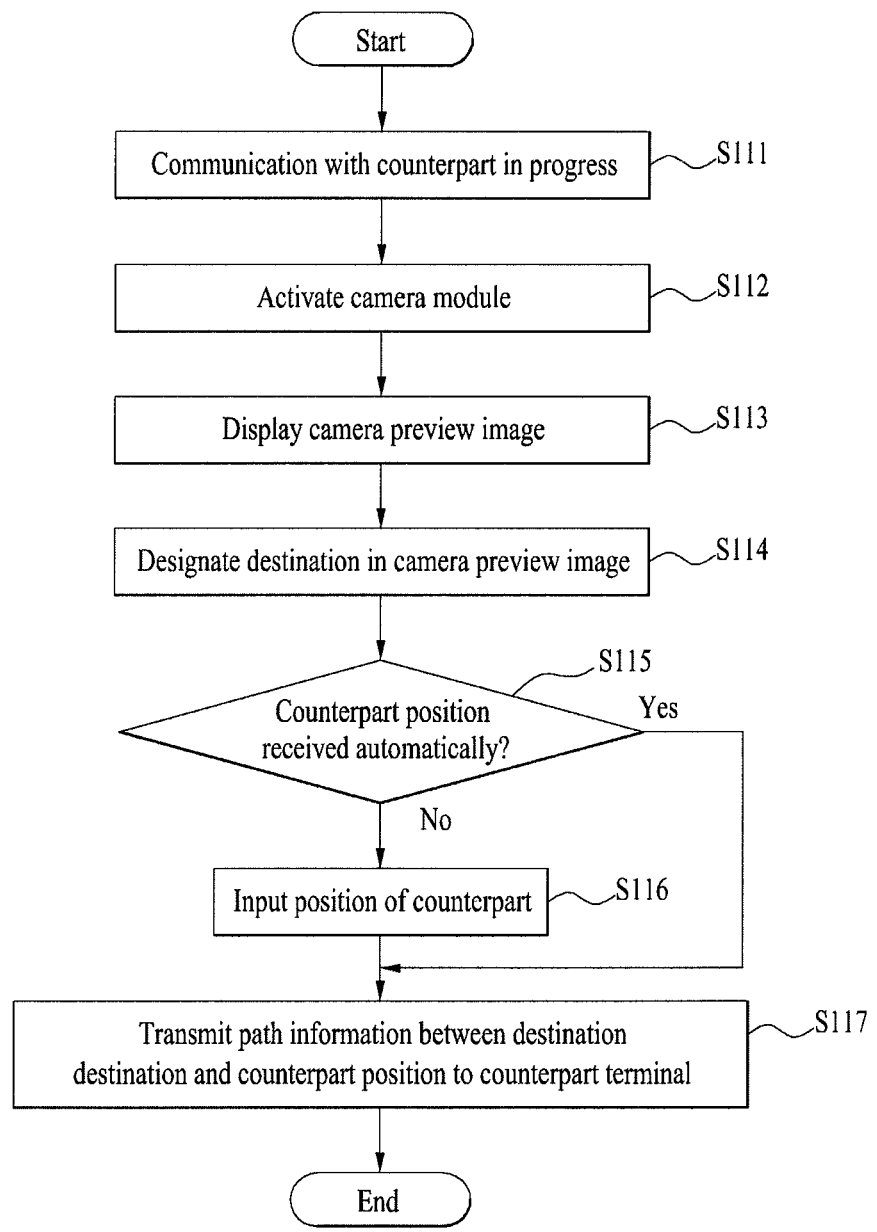
FIG. 11 is a flowchart for a method of controlling a mobile terminal according to an embodiment of the present invention.

FIG. 11 is a flowchart for a method of controlling a mobile terminal according to an embodiment of the present invention. FIG. 12 and FIG. 13 are diagrams of display screen configurations for implementing a method of controlling a mobile terminal according to an embodiment of the present invention.

Figure 12:
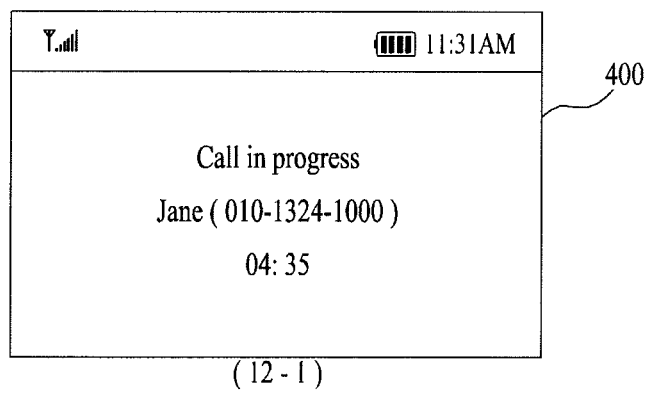
FIG. 12 and FIG. 13 are diagrams of display screen configurations for implementing a method of controlling a mobile terminal according to an embodiment of the present invention.
Figure 12:
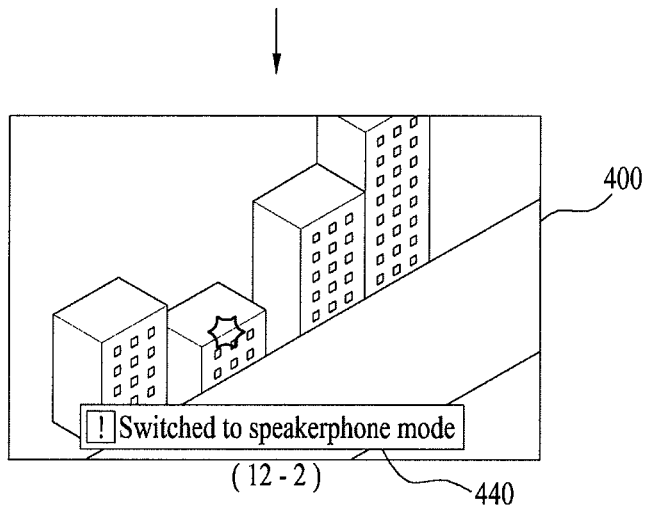
Figure 12:
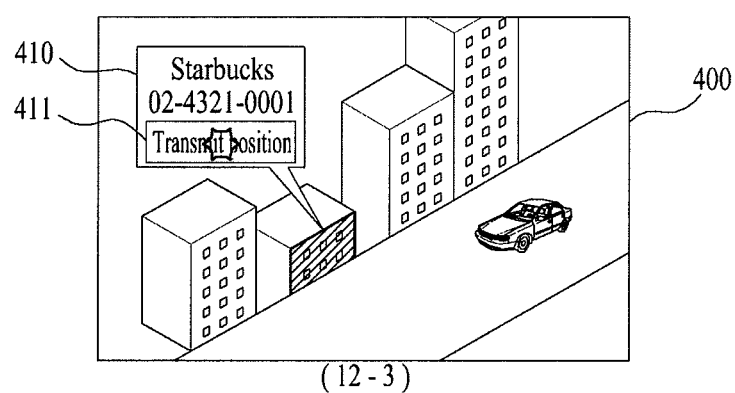
Figure 13:
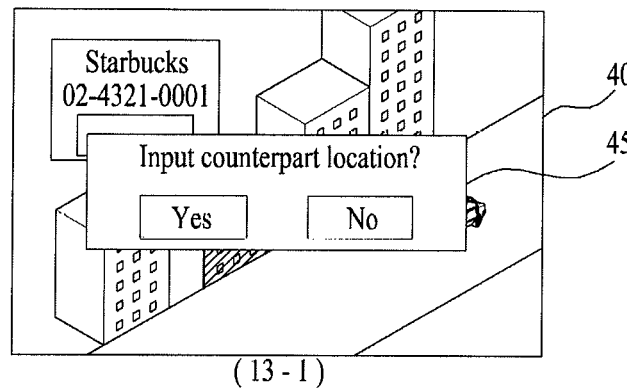
Figure 13:
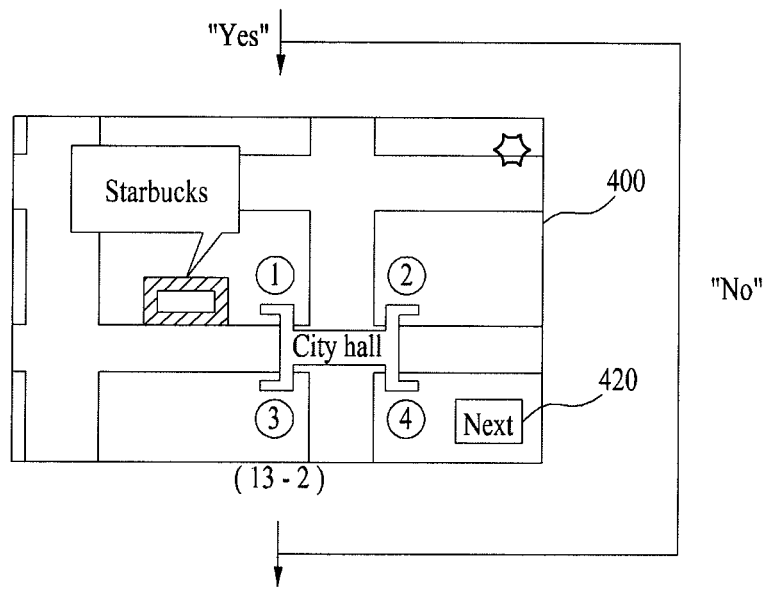
Figure 13:
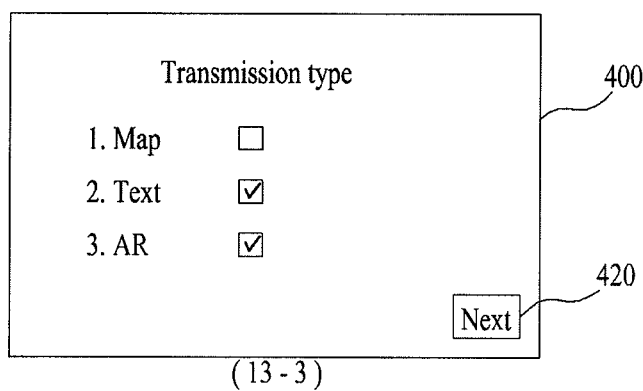

Referring to FIGS. 11 to 13, the mobile terminal 100 is performing a communication with a terminal of a counterpart of the mobile terminal 100. In this case, as mentioned in the foregoing description, the communication can include a voice call (or telephone call) communication or an instant message communication [S111]. FIG. 12 (12-1) exemplarily shows that the mobile terminal 100 is in the course of performing the voice call communication with the counterpart terminal.

In the course of the communication, the terminal user is able to activate the camera module 121 to provide a destination path to the counterpart [S112].

If the camera module 121 is activated, referring to FIG. 12 (12-2), the controller 180 is able to display the camera preview image on the touchscreen 400 [S113].

If the camera module 121 is activated while the voice call communication is being performed, the controller 180 is able to control the mobile terminal 100 to automatically enter a speakerphone mode. In this case, the speakerphone mode means a mode that enables a terminal user to perform a voice call with the counterpart without a separate earphone or headset instead of having his ear get closer to the mobile terminal 100 in a manner of outputting a relatively loud sound from the counterpart terminal.

When the mobile terminal 100 automatically enters the speakerphone mode, referring to FIG. 12 (12-2), the controller 180 can display alarm information 440 indicating the entry into the speakerphone mode.

Using the proximity sensor 141 provided around the touchscreen 400, the controller 180 is able to sense how far a body part (e.g., face) of the terminal user is spaced apart from the touchscreen 400.

If the body part of the terminal user is sensed as spaced apart from the touchscreen 400 over a prescribed distance, the controller 180 is able to turn off the microphone. If the body part of the terminal user is sensed as spaced apart from the touchscreen 400 within a prescribed distance, the controller 180 is able to turn on the microphone.

One point can be touched and sensed as a destination on the touchscreen on which the camera preview image is displayed [S 114].

Using the object information database, the controller 180 determines whether an object corresponding to the destination exits. If the object corresponding to the destination exits, referring to FIG. 12 (12-3), the controller 180 is able to display object information 410 of the corresponding object on the camera preview image by AR type.

As mentioned in the foregoing description, a position transmit icon 411 for transmitting a position of the corresponding object (i.e., the destination) to a counterpart can be displayed on the object information 410. And, a terminal user is able to input 'whether to transmit the position of the destination to the counterpart' to the mobile terminal 100 by touching and selecting the position transmit icon 411 for example.

For instance, if a user command for transmitting the destination position to the counterpart is inputted, e.g., by touching the position transmit icon 411, the controller 180 determines whether the position of the counterpart terminal can be automatically received from the counterpart terminal or the mobile communication network in the course of the communication [S115].

If it is unable to receive the position of the counterpart terminal automatically, referring to FIG. 13 (13-1), the controller 180 is able to display an inquiry window 450 for inquiring the terminal user whether to input the position of the counterpart manually.

If the terminal user selects to manually input the position of the counterpart via the inquiry window 450, referring to FIG. 13 (13-2), the controller 180 controls a map of the destination position and its periphery to be displayed on the touchscreen 400. As mentioned in the foregoing description, when the terminal user performs a touch & drag on the touchscreen 400, the controller 180 is able to control a currently unseen map to be newly displayed on the touchscreen 400 in a manner of scrolling the map on the touchscreen 400.

The terminal user is able to manually input a position of the counterpart by touching the touchscreen 400 for example [S116].

If the terminal user selects not to manually input the position of the counterpart via the inquiry window 450, the controller 180 is able to deliver the position information of the destination to the counterpart only instead of the path information to the destination. This is apparent to those skilled in the art from the aforesaid description and its details are omitted from the following description for clarity of the present specification.

If the position of the counterpart is manually inputted or can be automatically received, the controller 180 computes path information on a path from the position of the counterpart to the destination with reference to the map database.

As mentioned in the foregoing description, at least one path display types (e.g., AR type, map type, text type, etc.) for displaying the path information are displayed on the touchscreen 400 [FIG. 13 (13-3)]. As mentioned in the foregoing description, the terminal user is able to select at least one of the path display types.

The computed path information is transmitted to the counterpart in the course of the communication according to the selected path display type, as mentioned above. It details are omitted for clarity of the present specification [S117].

In the above description so far, the mobile terminal 100 provides the counterpart terminal with the destination position or the destination path. In the following description, a method of changing the destination position or the destination path is explained with reference to FIG. 14.

Figure 14:
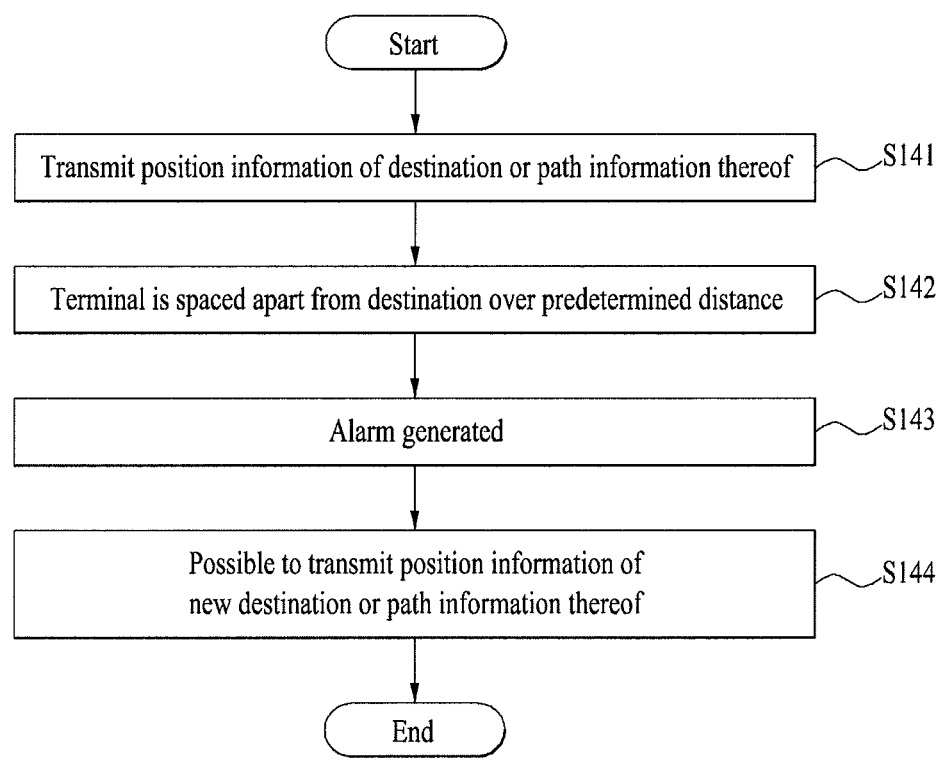
FIG. 14 is a flowchart for a method of controlling a mobile terminal according to an embodiment of the present invention.

FIG. 14 is a flowchart for a method of controlling a mobile terminal according to an embodiment of the present invention.

Referring to FIG. 14, as mentioned in the foregoing description, the mobile terminal 100 transmits the destination position or the destination path to the counterpart terminal [S141].

Subsequently, the controller 190 obtains a current position of the mobile terminal 100 via the position location module 115 continuously or periodically. If the current position of the mobile terminal 100 is spaced apart from the destination position over a prescribed distance, the controller 180 is able to output an alarm indicating the separation over the prescribed distance [S142, S143]. In this case, the outputted alarm can include at least one of vibration alarm, audio alarm and video alarm.

And, the controller 180 is able to display an inquiry window [not shown in the drawing] for inquiring whether to transmit a new destination position or path to the counterpart.

If the terminal user selects to transmit the new destination position or path to the counterpart via the inquiry window, the controller 180 automatically activates the camera module 121 and then controls to enter a procedure for providing the new destination position and path to the counterpart [S144]. Since the procedure for providing the destination position and path to the counterpart is already explained in the foregoing description, details shall be omitted from the following description for clarity.

Accordingly, the present invention provides the following effects and/or advantages.

First of all, according to at least one of embodiments of the present invention, a camera preview image provided by a camera module provided to a mobile terminal to photograph a video and/or a still picture is used to provide a terminal user with various kinds of information on an object within the camera preview image. In addition, the provided information can be shared with a counterpart.

It will be apparent to those skilled in the art that various modifications and variations can be specified into other forms without departing from the spirit or scope of the inventions.

For instance, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a wireless communication unit configured to wirelessly communicate with at least one other counterpart terminal;
a camera module configured to capture images;
a touchscreen display configured to receive touch inputs and to display information;
a position location module configured to provide a location of the mobile terminal; and
a controller configured to:
control the camera module to display a preview image on the touchscreen display without capturing the image,
receive a touch designation input command on the touchscreen display indicating a destination object included in the displayed preview image,
calculate position information of the designated destination object based on the location of the mobile terminal provided by the position location module,
display an icon including object information of the designated destination object and a transmit indicator for transmitting the calculated position information,
receive a touch selection of the transmit indicator,
control the camera module to capture the preview image with the displayed object information,
display a phonebook listing including a plurality of contacts for transmitting the calculated position information to,
receive a touch selection of at least one contact of the plurality of contacts included in the phonebook listing,
display a map menu including different display methods for displaying the calculated position information on a display of a counterpart terminal of the selected contact, said different display methods including an augmented reality image option of the calculated position information, and a text option describing the calculated position information, and
transmit both the text of the calculated position information and an augmented reality image of the captured image to the counterpart terminal, when both the augmented reality image and the text options are selected.

2. The mobile terminal of claim 1, wherein the controller is further configured to obtain position information of the counterpart terminal, to compute path information about a path from the obtained position information of the counterpart terminal to the designated destination object, and to transmit the computed path information to the counterpart terminal.

3. The mobile terminal of claim 2, wherein the controller is further configured to obtain a location of the counterpart terminal from the counterpart terminal via the wireless communication unit or from a user input unit on the mobile terminal.

4. The mobile terminal of claim 2, wherein the controller is further configured to display a map around the destination object on the touchscreen display, and designate a point on the map as a location of the counterpart terminal based on a received input signal.

5. The mobile terminal of claim 4, wherein the received input signal is a signal input via a user input unit on the mobile terminal or a signal input via a touching of the point on the map.

6. The mobile terminal of claim 2, wherein the controller is further configured to compute the path information between the destination object and a location of the counterpart terminal according to at least one of map information, text information, and augmented reality information.

7. The mobile terminal of claim 6, wherein the controller is further configured to display a menu for selecting a type of the path information on the touchscreen display, the type of path information corresponding to one of the map information, the text information, and the augmented reality information.

8. The mobile terminal of claim 7,
wherein, if the path information is one of the map information and the augmented reality information, the controller is further configured to transmit the path information to the counterpart terminal via a multimedia message or an email, and
wherein, if the path information is the text information, the controller is further configured to transmit the path information to the counterpart terminal via one of a short text message, the multimedia message and the email.

9. The mobile terminal of claim 8, wherein the controller is further configured to transmit the path information to a social networking system (SNS) previously registered with the mobile terminal.

10. The mobile terminal of claim 1, wherein the controller is further configured to control a speakerphone mode to be automatically entered when the camera module is activated to obtain the camera preview image during a call between the wireless communication unit and the counterpart terminal.

11. The mobile terminal of claim 10, further comprising:
a microphone; and
a proximity sensor provided in or around the touchscreen display,
wherein, when a user body part is sensed as approaching the touchscreen display within a prescribed distance, the controller is further configured to turn on the microphone for the speakerphone mode, and
wherein, when the user body part is sensed as being spaced apart from the touchscreen display via the prescribed distance, the controller is further configured to turn off the microphone.

12. The method of claim 11, further comprising:
displaying, on the touchscreen display of the mobile terminal, an inquiry window for inquiring whether to transmit a new position information to the counterpart terminal, if a current location of the mobile terminal is spaced apart from the destination object over a prescribed distance.

13. The method of claim 11, wherein the augmented reality image includes the captured image and the icon including the object information of the designated destination object but not including the transmit indicator.

14. The mobile terminal of claim 1, wherein the controller is further configured to calculate the position information of the designated destination object based on the location of the mobile terminal provided by the position location module and based on pattern recognition information.

15. The mobile terminal of claim 1, wherein the controller is further configured to display an inquiry window on the touchscreen display for inquiring whether to transmit a new position information to the counterpart terminal, if a current location of the mobile terminal is spaced apart from the destination object over a prescribed distance.

16. The mobile terminal of claim 15, wherein the controller is further configured to output an alarm indicating a separation over the prescribed distance.

17. The mobile terminal of claim 15, wherein the controller is further configured to automatically active the camera module if transmitting the new position information to the counterpart terminal is selected.

18. The mobile terminal of claim 1, wherein the augmented reality image includes the captured image and the icon including the object information of the designated destination object but not including the transmit indicator.

19. A method of controlling a mobile terminal, the method comprising:

allowing wireless communication with at least one other counterpart terminal via a wireless communication unit;

displaying, via a camera module and a touchscreen display on the mobile terminal, a preview image without capturing the image;

obtaining, via a position location module on the mobile terminal, a location of the mobile terminal;

receiving a touch designation input command on the touchscreen display indicating a destination object included in the displayed preview image;

calculating, via a controller on the mobile terminal, position information of the designated destination object based on the location of the mobile terminal obtained by the position location module;

displaying, on the touchscreen display, an icon including object information of the designated destination object and a transmit indicator for transmitting the calculated position information;

receiving, via the controller, a touch selection of the transmit indicator;

controlling, via the controller, the camera module to capture the preview image with the displayed object information;

displaying, on the touchscreen display, a phonebook listing including a plurality of contacts for transmitting the calculated position information to;

receiving, via the controller, a touch selection of at least one contact of the plurality of contacts included in the phonebook listing;

displaying, via the touchscreen display, a map menu including different display methods for displaying the calculated position information on a display of a counterpart terminal of the selected contact, said different display methods including an augmented reality image option of the calculated position information, and a text option describing the calculated position information; and transmitting, via the wireless communication unit, both the text of the calculated position information and an augmented reality image of the captured image to the counterpart terminal, when both the augmented reality image and the text options are selected.

20. The method of claim 19, further comprising:

obtaining, via the controller, position information of the counterpart terminal;

computing, via the controller, path information about a path from the obtained position information of the counterpart terminal to the designated destination object; and transmitting, via the wireless communication unit, the computed path information to the counterpart terminal.

21. The method of claim 20, wherein the obtaining step obtains a location of the counterpart terminal from the counterpart terminal via the wireless communication unit or from a user input unit on the mobile terminal.

22. The method of claim 20, further comprising:

displaying a map around the destination object on the touchscreen display; and designating a point on the map as a location of the counterpart terminal based on a received input signal.

23. The method of claim 22, wherein the received input signal is a signal input via a user input unit on the mobile terminal or a signal input via a touching of the point on the map.

24. The method of claim 20, wherein the computing step computes the path information between the destination object and a location of the counterpart terminal according to at least one of map information, text information, and augmented reality information.

25. The method of claim 24, further comprising:

displaying a menu for selecting a type of the path information on the touchscreen display, the type of path information corresponding to one of the map information, the text information, and the augmented reality information.

26. The method of claim 20, further comprising:

transmitting the path information to a social networking system (SNS) previously registered with the mobile terminal.

* * * * *